United States Patent [19]

England

[11] 3,894,887
[45] July 15, 1975

[54] HYDROGEN-BROMINE SECONDARY BATTERY

[75] Inventor: Christopher England, Pasadena, Calif.

[73] Assignee: California Institute of Technology, Pasadena, Calif.

[22] Filed: July 11, 1973

[21] Appl. No.: 378,127

[52] U.S. Cl................................ 136/86 S; 136/83 R
[51] Int. Cl..................... H01m 31/00; H01m 33/00
[58] Field of Search...... 136/6 L, 83 R, 86 A, 86 R, 136/86 E, 86 S

[56] References Cited
UNITED STATES PATENTS

| | | | |
|---|---|---|---|
| 3,132,972 | 5/1964 | Ludwig | 136/86 R |
| 3,214,296 | 10/1965 | Smatko | 136/86 A |
| 3,255,045 | 6/1966 | Powers et al. | 136/86 R |
| 3,285,781 | 11/1966 | Zite | 136/86 A |
| 3,421,994 | 1/1969 | Leduc | 136/86 A |
| 3,573,105 | 3/1971 | Weininger et al. | 136/86 A |
| 3,607,417 | 9/1971 | McRae | 136/86 A |

Primary Examiner—John H. Mack
Assistant Examiner—H. A. Feeley
Attorney, Agent, or Firm—Charlton M. Lewis

[57] ABSTRACT

A secondary battery utilizing hydrogen and halogen as primary reactants comprises inert anode and cathode initially contacting an aqueous solution of an acid and an alkali metal bromide. The hydrogen generated during charging of the cell is stored as gas, while the bromine becomes dissolved predominantly in the lower layers of the acid electrolyte. Preferred components comprise phosphoric acid and lithium bromide.

5 Claims, 1 Drawing Figure

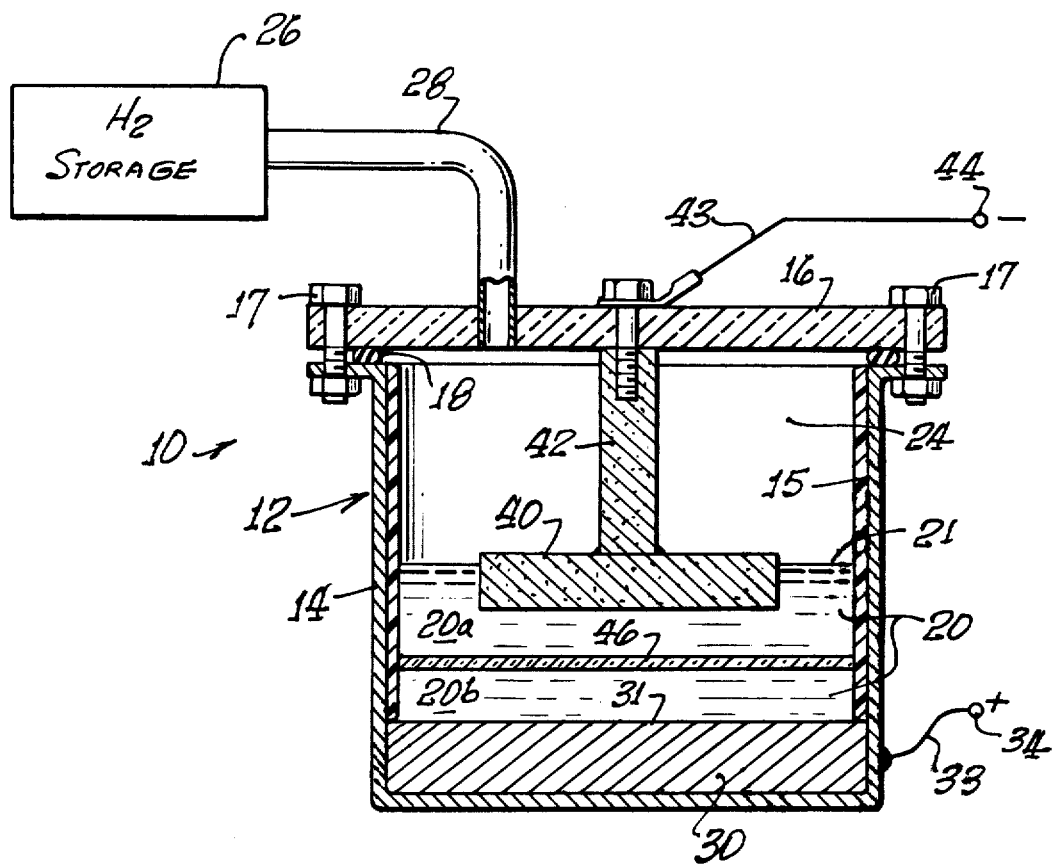

HYDROGEN-BROMINE SECONDARY BATTERY

This invention has to do with secondary batteries which utilize hydrogen and a halogen as primary reactants. The batteries of the invention typically employ an aqueous electrolyte containing ionized hydrogen halide, both electrodes being chemically inert. During charging of the cell hydrogen is produced at the negative anode and halogen at the positive cathode. During production of electrical current by the cell, the hydrogen is oxidized and the halogen is reduced, restoring the original ion concentration of the electrolyte.

A serious disadvantage of such cells is the limited solubility in water of the hydrogen halides of interest, which limits the electrical charge that can be stored in a cell containing a moderate volume of electrolyte.

In accordance with the present invention, that difficulty is overcome by providing the halogen ion in the electrolyte in the form of a soluble salt of the halogen and an alkali metal, and providing the hydrogen ion in the form of an acid which is preferably strong and highly soluble and which forms a soluble salt with the selected alkali metal. The resulting electrolyte, if substantially saturated with the alkali metal halide and containing at least a corresponding concentration of the selected acid, provides a rich source of both hydrogen ion and halogen ion. As those ions are consumed by electrolysis during charging of the cell, that is, as they are converted to hydrogen and halogen and cease to be present as ions, the electrolyte becomes predominantly a solution of the salt of the alkali metal and the acid. The volume of the electrolyte remains essentially constant, and its conductivity can be maintained satisfactorily high by providing a moderate excess of acid.

Secondary cells in accordance with the invention may utilize a wide variety of acids and of alkali metals. Organic acids may be used, such as formic, acetic and oxalic, for example, although they tend to be less soluble or less highly ionized in solution than many inorganic acids. For most purposes phosphoric and sulfuric acid are particularly effective in combining such desirable qualities as low cost, high solubility and ionization, and low electrochemical equivalent, that is, low mass per unit of electricity conveyed, or, in the present instance, low molecular weight per mole of hydrogen ion supplied to the solution.

All three of the common alkali metals are useful in the invention, either individually or in combination. Lithium has the advantage of extreme lightness, while sodium offers outstanding economy and potassium provides particularly high conductivity in solution.

A further aspect of the present invention concerns advantages of structure and operation of the cell that are available when bromine is employed as the halogen reactant. Although somewhat heavier than chlorine, bromine has the advantage that it is a liquid rather than a gas under normal conditions of temperature and pressure, and is readily soluble in the electrolyte. The hydrogen and the bromine produced during charging of the cell can be collected without mutual contamination by storing the hydrogen as gas above the electrolyte while the bromine remains in solution in the electrolyte. The cathode is preferably placed near the bottom of the body of electrolyte and the anode close to the electrolyte surface. The bromine then becomes dissolved predominantly in the lower layers of the electrolyte, while the hydrogen readily escapes through the surface. Convection in the electrolyte is substantially prevented by the appreciably greater density of the bromine-rich solution below as compared to the bromine-lean solution above. Convection is preferably further reduced by dividing the body of the electrolyte into two or more compartments by horizontal sheets of suitable porous material, such as glass fiber, for example.

A full understanding of the invention, and of its further objects and advantages, will be had from the following description of an illustrative manner of carrying it out, reference being had to the accompanying drawing, which is a schematic vertical section through a typical secondary cell embodying the invention.

The illustrative secondary cell comprises the cell container 12 which is preferably designed to retain fluid at superatmospheric pressure. As illustrated, container 12 comprises the vessel 14 of chemically inert metal such as stainless steel with an insulating lining 15 of polymerized tetrafluoroethylene or the like. The cover 16 is typically of insulative material secured to vessel 14 by the bolts 17 with the joint sealed by the gasket 18. If a metal cover plate is preferred, insulation may be provided at the bolts 17 and gasket 18. The body of electrolyte 20 is contained in the lower portion of vessel 14, preferably leaving an appreciable free volume 24 within container 12 and above the free surface 21 of the electrolyte for accommodating hydrogen gas.

That gas storage means may be supplemented by auxiliary storage means indicated schematically at 26, which is typically in free communication with volume 24, as via the conduit 28. The volume 24, or the combined volume of 24 and 26, is typically designed to receive all the hydrogen that will be evolved upon charging of the cell, as will be more fully described, at only a moderate predetermined internal pressure. The numeral 10 designates the entire housing means, comprising container 12 and also auxiliary hydrogen storage means 26 and conduit 28, if used.

The cathode 30 is formed of electrically conductive and chemically inert material, such as carbon, for example, and is mounted in the extreme lower portion of vessel 14, typically presenting a horizontal upper surface 31 to the electrolyte. Cathode 30 is typically in electrical contact with vessel 14, and is connected via the vessel and the conductor 33 to the positive cathode terminal 34.

The anode 40 is mounted by the conductive post 42 from cover 16, with electrical connection in sealed relation through that cover to the conductor 43 and the negative anode terminal 44. Anode 40 comprises a generally horizontal structure extending both above and below the level of the electrolyte surface 21 and thus presenting a large lower surface to the electrolyte and a corresponding upper surface to the gas in volume 24. The anode, which may be of any suitable type, is preferably formed of a porous, electrically conductive, and chemically inert material, such as carbon felt, for example. Thus, it is permeable for diffusion of the gas and the liquid electrolyte, and provides a large surface area at which they can react. Oxidation and reduction of hydrogen at the anode surface is facilitated by electrolytic deposition upon it of platinum or other suitable catalyst.

The body of electrolyte 20 is preferably divided horizontally into upper and lower portions 20a and 20b by the permeable separator 46, which permits substantially free diffusion of liquid and solutes but prevents mixing by convection. The separator is typically formed of glass fiber or similar nonconductive and inert material.

The two electrodes 30 and 40 are shown only schematically in the FIGURE. In particular, the detailed configuration of the electrodes and their mutual spacing are preferably varied in accordance with conventional battery practice to provide effective access of the active ingredients to the electrode surfaces.

The cell is initially filled to the desired level with an aqueous solution of acid and alkali metal bromide. Phosphoric and sulfuric acids are particularly suitable for that purpose. All three of the alkali metals, lithium, sodium and potassium, are satisfactory for formulation of the bromide. When the weight of the battery must be held to a minimum phosphoric acid and lithium bromide are particularly advantageous. The concentration of acid is typically selected to provide approximately maximum electrical conductivity in the solution, and the acid solution is then typically substantially saturated with the alkali metal bromide. The free volume 24 above the electrolyte surface is preferably initially filled with hydrogen, or may be evacuated of all gases other than water vapor. The same treatment applies to the auxiliary storage volume 26 and conduit 28, if used. That general assembly procedure results in a complete cell in fully discharged condition.

Specific electrolyte compositions in accordance with the invention are given below as Examples 1, 2 and 3, but are intended only as illustration. The relative concentrations of the components are given in parts by weight.

| Example 1 | |
|---|---|
| Water | 70. |
| Sulfuric acid | 30. |
| Lithium bromide | 46.3 |
| Example 2 | |
| Water | 80. |
| Acetic acid | 20. |
| Potassium bromide | 37.6 |
| Example 3 | |
| Water | 50. |
| Phosphoric acid | 50. |
| Lithium bromide | 125.4 |

To charge the cell, current is caused to flow through it from cathode terminal 34 to anode terminal 44, that is, from cathode 30 to anode 40. During that charging operation electrons supplied from the anode combine with hydrogen ions in the electrolyte to produce gaseous hydrogen, which emerges into the free volume 24. At the same time negative bromine ions from the electrolyte give up electrons to the cathode, forming molecules of $Br_2$, which are readily soluble in the aqueous solution. The resulting bromine-rich solution is appreciably heavier than the remainder of the electrolyte, and therefore tends to remain close to the electrode surface 31 at which the bromine was produced, resulting in a sharply stratified condition of the electrolyte. Separator 46 preserves that stratification against mixing by accidental convection.

As the charging process progresses, ions of bromine removed from lower chamber 20b and hydrogen ions removed from upper chamber 20a by electrolysis are partially replaced by downward migration of bromine ions and upward migration of hydrogen ions through separator 46. Hence bromine ions and hydrogen ions are progessively removed from both the upper and the lower chambers. As the cell approaches fully charged condition, the electrolyte in the upper chamber becomes predominantly an aqueous solution of the salt of the selected alkali metal and the selected acid, while the electrolyte in the lower chamber approaches a solution of the same salt containing a progressively larger concentration of dissolved bromine molecules.

The charging process is preferably terminated while there is still a sufficient concentration of bromine ions to prevent significant oxidation of other components of the electrolyte at the anode, and while there is still a sufficient concentration of hydrogen ions to maintain good electrical conductivity in the electrolyte. The latter condition is promoted by initially supplying acid and bromide to the electrolyte in such proportions that the atomic ratio of hydrogen to bromine exceeds unity by at least about 3 percent. Values of that ratio from about 1.03 to about 1.15 are generally satisfactory, with values near the lower end of that range preferred when a high value of energy density is desired. The illustrative compositions given above correspond to an excess of hydrogen ion of approximately 5 percent.

During discharge of the cell, the same reactions occur as during charging, but proceeding in the opposite directions. Thus, the hydrogen gas and bromine atoms diffuse to the respective active electrode surfaces and become electrolyzed to ionic form, with current flow through the external circuit from cathode terminal 34 to anode terminal 44.

The overall cell reaction, assuming for definiteness that the cell initially contained an aqueous solution of phosphoric acid and lithium bromide, typically as given above in Example 3, can be expressed as

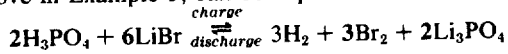

$$2H_3PO_4 + 6LiBr \underset{discharge}{\overset{charge}{\rightleftarrows}} 3H_2 + 3Br_2 + 2Li_3PO_4$$

Omitting the mass of the aqueous solvent, the theoretical energy density of the system for that particular selection of ingredients is about 103 watt-hours per pound.

What is claimed is:

1. A secondary electrical cell comprising
   a body of aqueous electrolyte which, in uncharged condition of the cell, consists essentially of acid from the group consisting of phosphoric and sulfuric acids, and alkali metal bromide from the group consisting of lithium, sodium and potassium bromides, the relative acid and bromide concentrations being such that the atomic ratio of hydrogen to bromine is at least about unity,
   anode and cathode structures formed of electrically conductive and chemically inert materials contacting the electrolyte with the anode spaced above the cathode,
   and housing structure for the electrolyte including means for containing hydrogen produced during the charging of the cell.

2. A secondary cell according to claim 1 in which, in uncharged condition of the cell, said acid is present in the electrolyte in approximately the concentration producing maximum electrical conductivity, and said bromide is present in the electrolyte in such concentration that the atomic ratio of hydrogen to bromine exceeds unity by at least about 3 percent.

3. A secondary cell according to claim 1 in which said body of electrolyte has a free surface within said housing means, said cathode structure contacts the electrolyte body predominantly in the lower portion thereof and said anode structure contacts the electrolyte body predominantly in the upper portion thereof and adjacent the free surface.

4. A secondary cell according to claim 3 including a generally horizontal separator permeable to the electrolyte and mounted between the anode and cathode structures and dividing said body of electrolyte into said two portions.

5. A secondary cell according to claim 1 in which said acid is phosphoric acid and said bromide is lithium bromide.

* * * * *